Feb. 27, 1934.　　　O. S. SELLS ET AL　　　1,948,545
CONVEYER FOR FEEDING CORN HUSKING MACHINES
Original Filed July 2, 1929　　2 Sheets-Sheet 1

Inventors
Ogden S. Sells and
Henry J. Wheeler
By Popp and Powers
Attorneys

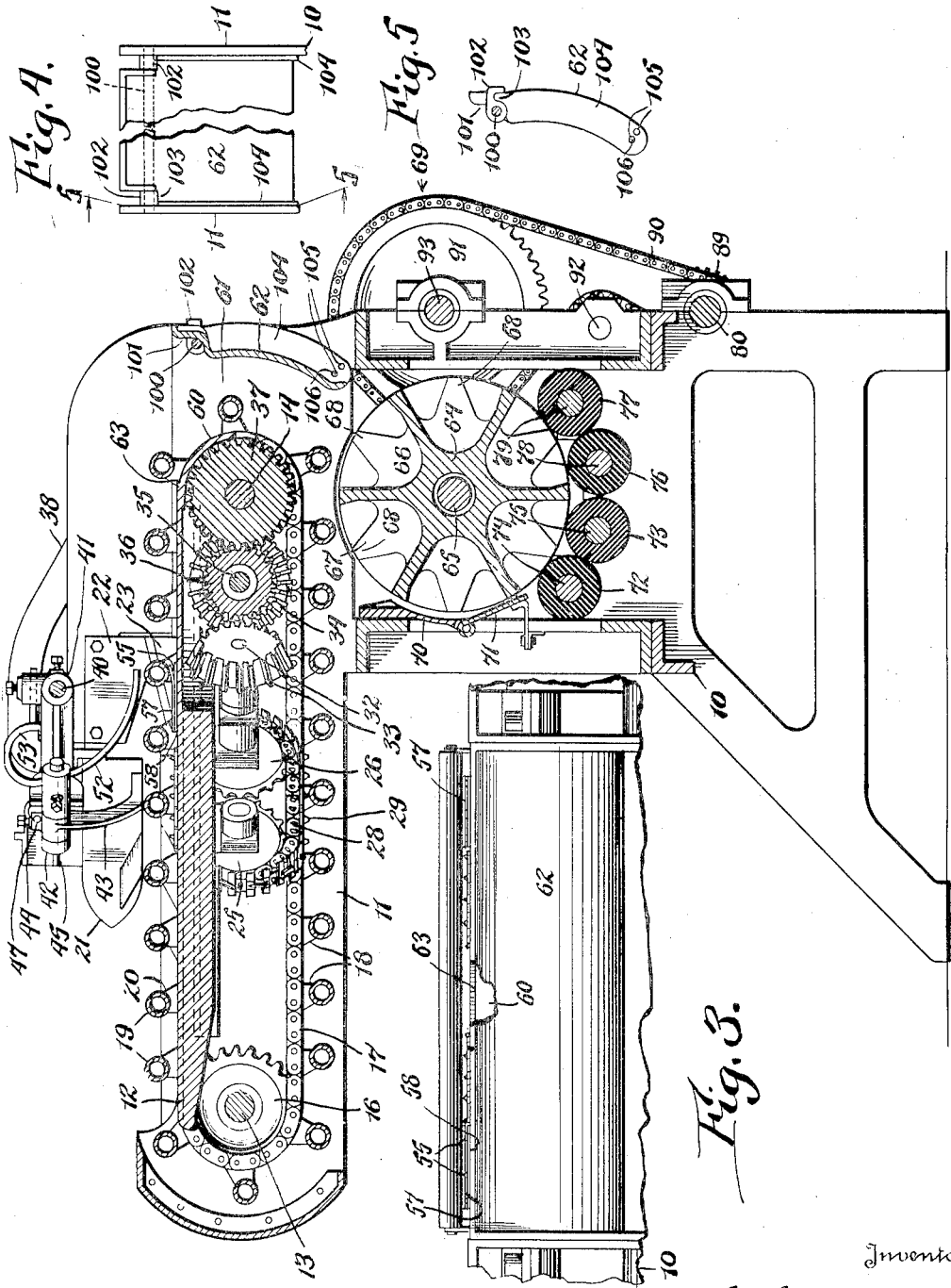

Patented Feb. 27, 1934

1,948,545

UNITED STATES PATENT OFFICE 1,948,545

CONVEYER FOR FEEDING CORN HUSKING MACHINES

Ogden S. Sells, San Francisco, Calif., and Henry J. Wheeler, Buffalo, N. Y., assignors to Sprague-Sells Corp., Hoopeston, Ill., a corporation of Illinois Original application July 2, 1929, Serial No. 375,445, now Patent No. 1,927,957, dated September 26, 1933. Divided and this application May 9, 1931. Serial No. 536,231

5 Claims. (Cl. 130—33)

This invention relates to a conveyer for husking machines and more particularly to a conveyer for a corn husker in which the ears of corn are individually placed upon a conveyer which carries the ears past gaging, debutting and husk shredding devices and delivers them to a husking device from which the husked ear is discharged.

This application is a division of our co-pending application for corn husking machine, Ser. No. 375,445, filed July 2, 1929 patented September 26, 1933, No. 1,927,957.

The principal object of the present invention is to provide a conveyer for such a machine which operates on ears of various sizes and shapes and in which there is little danger of the ears becoming stuck, jammed or misplaced while passing through the machine and in which any such ears can be easily removed. More specifically the invention proposes feeding the ears from a horizontal table to a vertical way in which particular provision is made to insure the free passage of the ears from the table to the vertical way by providing a step or drop for the ear as it passes from the part of the table forming the horizontal part to the rounded part of the table forming the vertical way, the ears of corn in all instances being positively propelled by a chain conveyer.

Another object is to provide means for opening one side of said vertical way and also for adjusting the size of said vertical way to adapt the machine to ears of various sizes.

In the accompanying drawings:

Fig. 2 is a vertical longitudinal section therethrough.

Fig. 3 is a fragmentary rear elevation thereof.

Fig. 4 is a rear elevation of the removable and adjustable rear plate of the machine.

Fig. 5 is a vertical section taken on line 5—5, Fig. 4.

Figure 1:
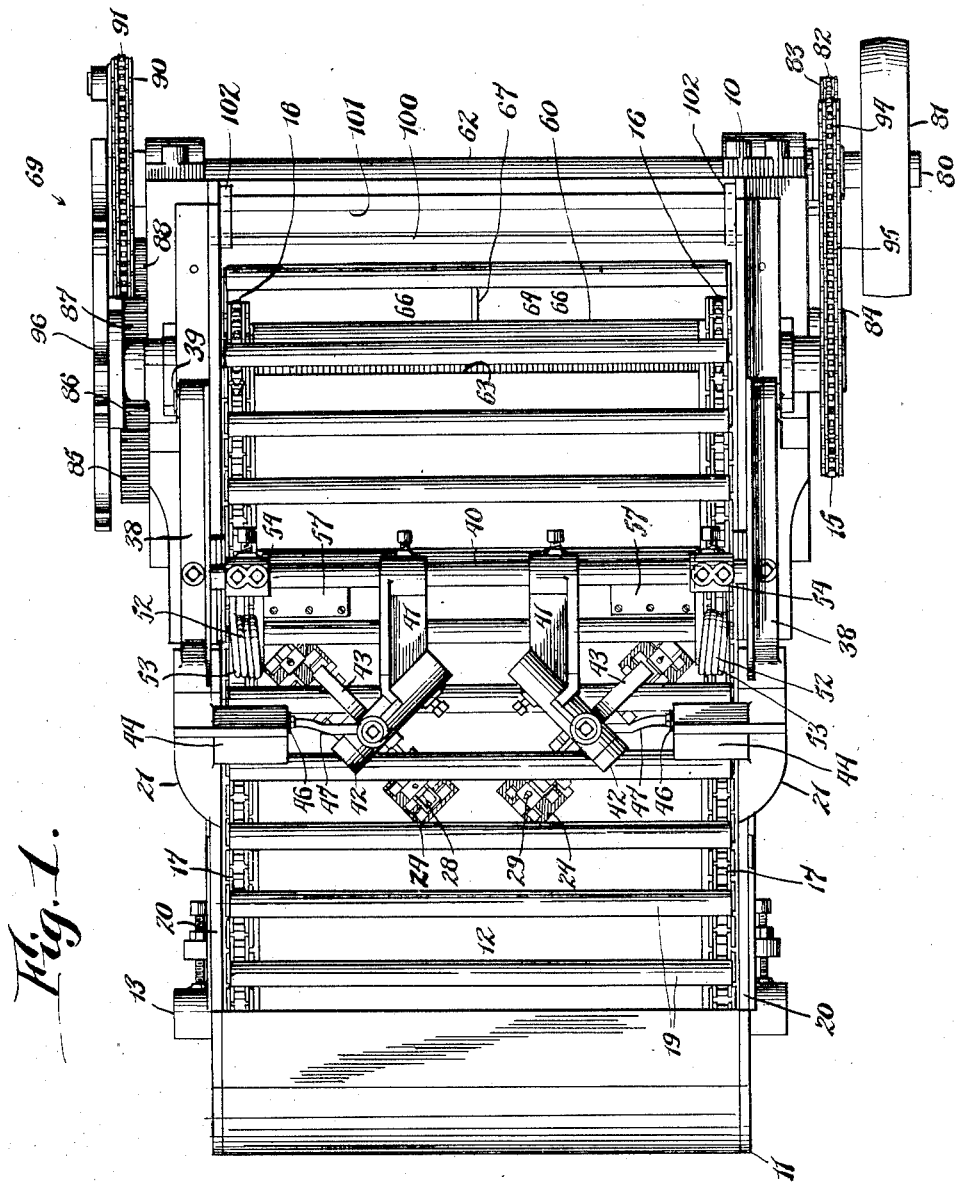
Fig. 1 is a top plan view of a corn husking machine embodying our invention.

The operating parts of the present invention are supported by a frame 10 which may be of any suitable construction and is preferably formed to provide a forwardly extending part 11 which supports a horizontal plate 12 forming the feeding table. Journaled in the frame 10 at opposite ends and below the table 12 are two transverse conveyer shafts 13 and 14, the rear shaft 14 forming the driving shaft and carrying a driving sprocket 15 at one end. Each of the conveyer shafts 13 and 14 carries a pair of sprocket wheels 16 which carry a pair of conveyer chains 17. These conveyer chains 17 are arranged adjacent the sides of the table 12 and the upper stretch of each is arranged substantially even with the upper table surface, as shown in Fig. 2, while the lower stretch is arranged below the table. Each of the conveyer chains 17 carries a plurality of spaced arms 18 which are secured to the chains in any suitable manner and project outwardly therefrom. To the outer ends of each of the corresponding pair of arms of both chains cross rods or bars 19 are secured, which bars extend across the table and are spaced above the upper surface of the same. The conveyer bars 19 are spaced apart a sufficient distance to form pockets accommodating the ears of corn between the same with the ears arranged parallel with the bars, and the operator places the ears between the bars at the front end of the table and as the conveyer chains are turned, the ears are propelled sidewise along the table to the debutting and husking devices. The operator places the ears of corn at opposite sides of the table with the butts adjacent stationary gage plates or shoulders 20 which are secured to the frame in any suitable manner adjacent the outer sides of the conveyer chains 17 and extend above the level of the table as indicated in Fig. 2.

While passing along the table 12 the ears are debutted and the husks shredded by suitable placing, gaging, debutting and shredding means. As these devices form no part of the present invention they are illustrated only in a general way and form a more complete description of these devices reference is made to the parent application, Ser. No. 375,445 of which this is a division. In general these devices are constructed as follows:

Each of the stationary gage plates 20 cooperates with a movable gage shoe 21 in engaging the butt of each ear and positioning the ear so that the butt is severed at the proper place by the debutting knives 22 and 23 which subsequently engage the ear.

To move the butts of the ears against the gage plate 20 and the movable gage shoe 21, an ear placing device is provided on each side of the table adjacent the gaging members, which placing devices are similar in construction and operation and hence the following description of one will be deemed to apply to both.

A diagonal slot 24 is provided at each side of the feed table 12, each of these slots extending diagonally outward and rearwardly toward the gage shoe 21. Below each of these slots a pair of sprocket wheels 25 and 26 are mounted in suitable bearings hung from the feeding table 12 and these sprockets carry a diagonal placing chain 28. The upper stretch of each of these placing chains 28 passes up through the slots 24 and alternate links thereof carry teeth or spurs 29 which are adapted to engage the underside of the ears of corn as the ears are propelled over the same by the main conveyer.

The sprocket wheel 26 of each placing device is mounted on a diagonal drive shaft 32 to the rear end of which a miter gear 33 is fixed. Each of the miter gears 33 meshes with a miter gear 34 mounted on a transverse shaft 35. This shaft 35 is suitably supported from the main frame and carries a pinion 36 which, as best shown in Fig. 2, meshes with a gear 37 mounted on the conveyer drive shaft 14. It is therefore apparent that as the conveyer drive shaft 14 is turned to advance the conveyer chains 17 and bars 19 and the ears carried thereby the placer chains 28 through the gear 27, pinion 36, shaft 35, miter gear wheels 34 and 33, shafts 32 and sprockets 26 are each turned so that the upper stretch thereof is moved toward the gaging devices. Since the spurs 29 engage the undersides of the ears, the ears are moved butt first outward and into engagement with the gage plate 20 and shoe 21 for proper gaging with reference to the butt severing knives. The movement of the placer chains 28 is so timed that they move somewhat faster than the conveyer chains 17 and at an equal rate lengthwise of the table, that is, any part or point on the upper stretch of each placer chain 28 stays in the same relative position to the conveyer bars 19 and merely moves lengthwise thereof. By this means the placer chains neither tend to advance the ear in its sidewise movement nor to retard the same but operate solely to move the ear lengthwise against the gage members while it is being conveyed sidewise by the main conveyer.

Each of the conveyer shoes 21 is bullet shaped in outline, the nose thereof being rounded to carry the butts downwardly as they are conveyed by the conveyer in the event that they are not in proper position. Each gage shoe 21 is removably mounted on an arm 38 which is pivotally mounted on a pin 39, this pin being carried by the main frame some distance in rear of the shoe 21 and in line with the same.

A cross bar 40 is carried by the main frame above the level of the movable gage shoe 21 and in rear of the same and this fixed cross bar 40 carries a pair of fixed supporting arms or brackets 41. Each of these arms or brackets 41 extends forwardly from the cross rod 40 and at its outer or forward end is formed to provide a diagonally outward extending socket which carries a headed pin 42. On each of these pins 42 a finger 43 is pivotally mounted, the lower end of this finger being curved and being arranged in the path of the corresponding procession of ears on the main conveyer. On its inner side each of the shoes 21 is formed to provide an upper jaw 44 and a lower jaw 45 and between these two jaws a roller 46, carried by an arm 47, is arranged. The arm 47 is arranged transverse to the line of movement of the ears and hence oblique to the line of movement 43 and at its end passes through and is secured to the upper end of the holddown finger 43.

It is therefore apparent that since the arm 47 and roller 46 is arranged to the rear of the axis of the holddown finger 43, when the finger 43 is raised by a passing ear of corn the arm 47 and roller 46 will be swung upwardly thereby lifting the shoe 21 correspondingly.

When the ear of corn passes the finger 43 the shoe 21 and finger 43 together return to their normal position. It is therefore apparent that the greater the diameter of the ear the higher the holddown finger 47 will be raised and that therefore the shoe 21 will be correspondingly raised a greater extent. By this means the movable gage 21 is opened or lifted to conform to the size of the ear being gaged and it therefore follows that when an unusually large ear is being gaged the shoe 21 will be lifted to permit a greater extent of its butt to be received between the gage shoe 21 and the gage plate 20 and hence the ear properly positioned to insure the butt being cut off beyond the point where the leaves of the husk join the stem. By this means each ear is gaged and positioned according to its size and hence the butts are likewise severed at the proper places and the ears are put in proper condition for husking.

The cutting knives 22 and 23 are arranged in pairs on opposite sides of the machine and are suitably removably bolted to the main frame 10 by bolts or otherwise. The cutting edges of the two knives are inclined and together form a cutting notch or V into which the butt end of the ear is carried by the main conveyer mechanism and the butt severed at a point determined by the movable gaging shoe 21.

To prevent the ear of corn from up ending while its butt is being severed, holddown devices are provided which engage the body of each ear while the ear is passing the cutting knives 22 and 23. These devices each comprise a spring finger 52 which is coiled at its upper end as indicated at 53 and the upper end thereof is secured in a collar 54 which collar is suitably secured to the fixed cross rod 40. These spring fingers are preferably flattened at their lower ends. Before the ears pass to the husking rolls, the husks are torn or shredded so as to loosen them and provide loose ends which permit the husks to be gripped by the rolls and torn from the ears. This is accomplished during the butt severing operation by a series of pointed teeth 55 which project upwardly from a plate 56 mounted on the feeding table 12 adjacent each pair of debutting knives. To prevent the accumulation of pieces of husk and silk in front of these teeth, which would render them inoperative, a spring guard 57 is provided for each series of teeth and normally covers the same. Each of these spring guards is in the form of a plate which is secured at its front end by means of screws which also hold the plate 56 to the feeding table, and this spring plate is provided with holes which receive the teeth 55 when the spring plate is sprung downwardly. The ears of corn in passing over the spring plate 57 are forced down under the influence of the holddown spring fingers 52 and force the spring plate 57 downwardly and thereby expose the teeth 55 which bite into the husk of the ear as it passes and tear the husk. After the ear passes the spring plate 57 is released and in returning clears the teeth 55 from any bits of silk or husk which have lodged against the same The debutted and shredded ears are then conveyed along the feeding table 12 by the main conveyer and are carried around the rounded downturned end 60 at the rear end of the table and into a vertical way or passage 61 formed by a removable and adjustable rear cross plate 62.

This downturned part 60 of the feeding table 12 is concentric with the axis of the conveyer drive shaft 14 and to prevent the ears from being caught in the conveyer while being carried around this downturned part 60, the outer face of the rounded downturned part 60 is spaced closer to the drive shaft 14 than the horizontal part of the feed table, thereby forming a step 63 between these two parts of the feed table. It has been found in practice that by the provision of this step 63 and relatively depressed rounded part 60 on the feeding table, the ears are conveyed over the horizontal part of the feeding table 12 and into the vertical way 61 easily and without being caught or jammed between the conveyer bars 19 and the rounded part 60 of the table, this step or drop 63 permitting the ears to drop and give more room for any husks which may have been drawn back under the bars 19 to free themselves so as to transfer efficiently to the way 61 and not carry around past the feeding table. In machines used where the rounded part 60 formed a continuation of the horizontal part of the feeding table, ears frequently became jammed or caught in the conveyer and had to be cleared.

In order to clean the machine expeditiously, the rear plate 62 is removable. For this purpose a fixed cross bar 100 is provided at the rear end of the machine. The plate 62 is offset rearwardly at its upper end to form a pocket 101 which receives this cross rod. On this cross rod is pivotally mounted a pair of latch members or dogs 102 each of which is adapted to hook over a shoulder 103 at each end of the cross plate 62. At opposite ends the cross plate 62 is provided with rearwardly extending side flanges 104 which are disposed against the adjacent sides of the machine frame. At the lower end of each of these side flanges 104 a pair of holes 105 is provided and each of these holes is adapted to receive a fastening bolt 106 which extends through the main frame and secures the lower opposite ends of the rear plate 62 to the machine frame. These openings are so disposed that when the rear plate is bolted through the rearmost of the holes 105 the plate is in a forward position and consequently the vertical way 61 is constricted. Conversely, by shifting the plate rearwardly and fastening it by its foremost set of holes 105 the vertical way 61 is widened. This adjustability of the effective size of the vertical way 61 has been found to be of importance since when small ears of corn were being husked and the way 61 was too large, they would not always enter the subsequent mechanism properly, whereas with the present invention the size of the way can be adjusted to the particular size of ears being husked.

Below the vertical way or passage 61 is arranged a drum or cylinder 64 which is fixed on a transverse shaft 65, this shaft being suitably journaled in the main frame. This drum is formed to provide two series of longitudinally extending pockets 66, one series being arranged on each side of the drum and the two series being separated by a partition 67, the outer ends of the pockets being closed by end heads.

In order to insure the dropping of the ears into correct position in the pockets 66 the central partition 67 is preferably made star shaped, having points 68 which extend outwardly to the periphery of the drum and are located centrally with reference to the pockets. It occasionally happens that when the ears fall onto the drum 64 the tip or butt of some fall upon the central partition 67. If the central partition 67 were circular and of the same diameter as the drum, such ears would become jammed in the machine and not be properly husked and also require stopping of the machine to effect their removal. By making the central partition star shaped, the butts or points of the ears so falling engage the points 68 and cannot, of course, rest thereon but slide down into the pockets in which they are conveyed, without danger of jamming, to the husking mechanism.

To this drum is imparted a step-by-step movement by means of a Geneva gear 69 as hereinafter described and its movement is so synchronized with the conveyer that as a pair of ears is being discharged from the vertical way 61 by the conveyer a pocket 66 is in position to receive each of the ears and before the next pair of ears is discharged from the conveyer, the drum is rotated to bring the next succeeding pair of empty pockets into position to receive them. One ear is therefore received in each pocket and the ears are therefore individually carried around by the drum.

In front of the drum a transverse baffle plate 70 is secured to the main frame and to the lower end of this baffle plate 70 a movable baffle plate 71 is pivotally mounted, this baffle plate 71 being movable away from the drum to permit of the removal of ears from the pockets and nubs or other small pieces from the front pair of husking rolls 72 and 73. The fixed baffle plate 70 is also spaced from the lower stretch of the main conveyer to provide a space therebetween through which ears improperly received in the pockets of the drum are caught in the conveyer and are drawn out of the machine. While one pair of pockets 66 is being held in position to receive an ear of corn from the main conveyer the opposite pair of pockets is disposed over the first pair of husking rolls 72 and 73. These husking rolls are made of rubber and are carried by transverse shafts 74, 75 which are journaled in bearings carried by the main frame. The rolls are continuously rotated in opposite directions so that their opposing faces pass downwardly to draw the husks of the ear of corn downwardly between them and remove them from the ear. It is therefore apparent that for a definite period each ear is positively held in engagement with the first set of husking rolls 72 and 73 by the pocket of the drum in which it is arranged.

On the next forward step of the drum the partly husked ear is removed from the first or primary set of husking rolls onto a second set of husking rolls 76, 77 which are mounted on continuously rotating shafts 78, 79 and serve to remove the remainder of any husks on the ears. On the next forward step of the drum, the completely husked ears are discharged from the drum and out through the rear end of the machine. By providing a dwell or two separate periods in which the ear is positively held in engagement with two pairs of husking rolls, the complete removal of the husks from the ear is insured as well as all remnants of silk. The driving gearing for the machine forms no part of the present invention and is more completely illustrated in the said parent application, Ser. No. 375,445 and in general is arranged as follows:

The numeral 80 represents a main drive shaft which is journaled at the rear end of the main frame and carries a driving pulley 81 which is driven by a belt or in any suitable manner. Between the driving pulley 81 and the main frame a sprocket wheel 82 is fixed to the drive shaft 80 and the sprocket wheel is connected by a driving chain 83 with a small sprocket 84 mounted on the shaft 78 which carries the first husking roll 76 of the second pair of rolls. At the opposite side of the machine the husking roll shafts 74, 75, 78 and 79 are connected by a train of pinions 85, 86, 87 and 88 which compel all of the husking rolls to turn in unison and in the proper direction to strip the husks from the ears as they are successively presented to the two pairs of rolls.

On the same side of the machine the main drive shaft 80 carries a sprocket 89 which drives an endless chain 90. This chain passes around and drives the driving wheel 91 of the Geneva gear 69 and thence around an idler 92. The driving wheel 91 of the Geneva gear is fixed to a transverse shaft 93 on the opposite end of which a sprocket 94 is carried. This sprocket 94 is connected to the main conveyer driving sprocket wheel 15 by a chain 95 and since the train of gearing as described is continuously rotating the main conveyer is advanced uniformly and continuously.

The driven star wheel 96 of the Geneva gear 69 is mounted on the shaft 65 which carries the drum 64. The driving and driven wheels 91 and 96 of the Geneva gear 69 can be of any usual and well known construction to impart a step-by-step advancing movement to the drum 64 and one suitable for use is best illustrated in our said co-pending parent application, Ser. No. 375,445. The timing of the Geneva gear is preferably such that each time an ear of corn is delivered to the drum 64 by the main conveyer, an empty pocket has been brought in position to receive this ear.

A summary of the operation of the machine is as follows: The operator places a pair of ears of corn with their points opposing each other between a pair of conveyer bars 19 of the main conveyer and preferably with their butts arranged over the side gage plates 20. As the ears are carried along sidewise by the conveyer the ears are engaged by the teeth 29 of the diagonal placing chain 28, the upper stretch of which moves outwardly and in timed relation to the conveyer chain so that the ears are moved outwardly or butt first against the opposing shoulders formed by the gage plates 20 and the gage shoes 21. As the ears pass along they lift the fingers 43 which rock their respective arms upwardly and elevate the gage shoes 21 in accordance with the size of the ears being gaged. By this means the larger the ear the larger the gage opening between the plate 20 and shoe 21 and each ear is selectively positioned in accordance with its size with reference to the debutting knives to insure debutting at the proper place for effective husking. The ears so positioned are then carried past the debutting knives 22 and 23 which sever the butts and carry them over the shredding fingers 55 which tear or shred the husk of the ear. The debutted pair of ears is then carried over the shoulder 63 from which it drops and frees itself from the conveyer for free passage into the vertical way 61 and is discharged into the two upper pockets at the opposite ends of the drum 64. This drum is rotated step-by-step in synchronism with the main conveyer of the Geneva gear 69 and the pair of ears are thereby first presented and held in engagement with the first pair of continuously rotating husking rolls 72 and 73 and upon the next step of the drum are held in engagement with the second pair of continuously rotating husking rolls 76 and 77 which latter operate to remove any husks or silk not removed by the first pair of husking rolls. On the next step of the drum the pair of ears are thrown out of the pocket and from the rear end of the machine completely husked.

It will be noted that by the provision of the step 63 the ear is dropped away from the conveyer bars 19 just as the ear is about to drop in the vertical way 61 and this step has proved of prime importance in securing a free passage and release of the ears in the vertical way 61 to the pockets of the drum 64. It will also be noted that by making the vertical way adjustable as to width, through the provision of the adjustable rear plate 62, the size of this way can be adjusted to suit the size of the ears being operated on and by so doing the proper entry of the ears into the pockets 66 is made more sure.

We claim as our invention:

1. In a corn husker, a machine frame including side plates, a table on said side plates, means for conveying the ears of corn along said table, husking devices arranged below the rear end of said table, a cross rod between said side plates beyond the rear end of said table, a rear cross plate hung on said cross rod and forming a vertical way for conducting the ears of corn from said table to said husking devices and means for adjustably moving the lower end of said plate toward and from said table to vary the effective size of said vertical way.

2. In a corn husker, a machine frame including side plates, a table on said side plates, means for conveying the ears of corn along said table, husking devices arranged below the rear end of said table, a cross rod between said side plates beyond the rear end of said table, a rear cross plate hung on said cross rod and forming a vertical way for conducting the ears of corn from said table to said husking devices, latch means for latching said rear plate to said rod, and means for adjustably moving the lower end of said plate toward and from said table to vary the effective size of said vertical way.

3. In a corn husker, a machine frame including side plates, a table carried by said side plates and composed of a front part and a downwardly extending rear part, an endless conveyer passing over the front and rear parts of said table and parallel thereto and conveying the ears of corn from the front end thereof around said rear part, husking devices arranged at the lower end of said rear part, a cross rod between said plates in rear of said rear part, a rear cross plate hung upon said cross rod and forming with said rear part a vertical way through which the ears pass and means for adjustably moving the lower end of said cross plate toward and from said rear part to vary the effective size of said way.

4. In a corn husker, a table composed of a horizontal front part and a semi-cylindrical rear part curving downwardly relative to said front part, husking devices arranged at the end of said rear part, an endless conveyer passing over the front and rear parts of said table and parallel thereto and conveying the ears from the front end thereof to said husking devices, the downwardly extending rear part of said table being spaced a greater distance from said conveyer than the front part of said table thereby to provide a downward step from said horizontal part to said curving rear part, said spacing permitting the ears to free themselves from said conveyer on passing over said rear part and effecting a free transfer of said ears to said husking devices.

5. In a corn husker, a feeding table having a horizontal front part, transverse shafts arranged under opposite ends of said table, conveyer wheels carried by said conveyer shafts said wheels being arranged at opposite sides of said table, flexible endless members carried by said conveyer wheels on opposite sides of said table, spaced arms mounted on said flexible endless members and projecting outwardly therefrom, cross bars extending across said table and connected at their opposite ends to said arms thereby to convey the ears of corn sidewise along said table, the rear end of said table being formed to provide a semi-cylindrical downwardly curving part down which said bars convey said ears the outer face of said depending rounded part being substantially concentric with the adjacent conveyer shaft, and the outer face of said rounded part being spaced closer to said shaft than the upper face of said feeding table thereby to provide, substantially directly above the axis of the rear conveyer wheel, a downward step from the horizontal part of said table to the downwardly curving semi-cylindrical rear part of said table thereby insuring proper movement of the ears of corn along said feeding table and around said rounded part.

OGDEN S. SELLS.
HENRY J. WHEELER.